(12) United States Patent
Wang et al.

(10) Patent No.: US 11,721,869 B2
(45) Date of Patent: Aug. 8, 2023

(54) BATTERY PACK

(71) Applicant: Jiangsu Contemporary Amperex Technology Limited, Jiangsu (CN)

(72) Inventors: Zhichao Wang, Jiangsu (CN); Wumei Fang, Jiangsu (CN)

(73) Assignee: Jiangsu Contemporary Amperex Technology Limited, Changzhou (CN)

(*) Notice: Subject to any disclaimer, the term of this patent is extended or adjusted under 35 U.S.C. 154(b) by 290 days.

(21) Appl. No.: 16/499,268

(22) PCT Filed: Jul. 26, 2019

(86) PCT No.: PCT/CN2019/097912
§ 371 (c)(1),
(2) Date: Sep. 28, 2019

(87) PCT Pub. No.: WO2021/012290
PCT Pub. Date: Jan. 28, 2021

(65) Prior Publication Data
US 2021/0336308 A1    Oct. 28, 2021

(30) Foreign Application Priority Data
Jul. 22, 2019  (CN) .......................... 201921154826.8

(51) Int. Cl.
*H01M 50/258*  (2021.01)
*H01M 50/209*  (2021.01)
*H01M 50/264*  (2021.01)

(52) U.S. Cl.
CPC ....... *H01M 50/258* (2021.01); *H01M 50/209* (2021.01); *H01M 50/264* (2021.01)

(58) Field of Classification Search
CPC combination set(s) only.
See application file for complete search history.

(56) References Cited

U.S. PATENT DOCUMENTS 6,761,992 B1 * 7/2004 Marukawa .......... H01M 10/613
429/96
2006/0269842 A1 * 11/2006 Ichinose ............... H01M 4/801
429/251

(Continued)

FOREIGN PATENT DOCUMENTS

CN      208986062 U    6/2019
CN      209104213 U    7/2019

(Continued)

OTHER PUBLICATIONS

PCT International Search Report for PCT/CN2019/097912, dated Apr. 28, 2020, 9 pages.

(Continued)

*Primary Examiner* — Ula C Ruddock
*Assistant Examiner* — Sarika Gupta
(74) *Attorney, Agent, or Firm* — East IP P.C.

(57) ABSTRACT

The present disclosure relates to a battery pack comprising: a module assembly comprising two or more battery modules, wherein each of the battery modules comprises a battery core and an end plate, a plurality of battery cores are arranged side by side along a length direction of the battery pack, the end plate is located on at least one side of the plurality of battery cores in the length direction, and the two or more battery modules are arranged side by side along a width direction of the battery pack; and a limiting plate disposed on at least one side of the module assembly in the length direction and correspondingly to the end plate, wherein the limiting plate comprises an inner side surface towards the end plate.

16 Claims, 3 Drawing Sheets

(56) References Cited

U.S. PATENT DOCUMENTS

| | | | |
|---|---|---|---|
| 2007/0087266 A1* | 4/2007 | Bourke | H01M 10/647 |
| | | | 429/61 |
| 2011/0206948 A1* | 8/2011 | Asai | H01M 10/482 |
| | | | 429/7 |
| 2013/0164592 A1* | 6/2013 | Maguire | H01M 50/209 |
| | | | 429/120 |
| 2015/0064545 A1* | 3/2015 | Murakami | H01M 50/224 |
| | | | 29/469 |
| 2015/0147630 A1* | 5/2015 | Nakano | H01M 4/13 |
| | | | 429/188 |
| 2017/0025653 A1 | 1/2017 | March | |
| 2019/0088911 A1 | 3/2019 | Peng et al. | |

FOREIGN PATENT DOCUMENTS

| | | |
|---|---|---|
| CN | 209183611 U | 7/2019 |
| CN | 110323376 A | 10/2019 |
| EP | 1990861 A1 | 11/2008 |

OTHER PUBLICATIONS

The extended European search report for European Application No. 19769982.0, dated Feb. 26, 2021, 8 pages.
The Second Office Action for European Application No. 19769982.0, dated Apr. 28, 2022, 5 pages.

\* cited by examiner

BATTERY PACK

CROSS REFERENCE

The present disclosure is a National Stage of an International Patent Application No. PCT/CN2019/097912 filed on Jul. 26, 2019, which claims the benefit of a Chinese Patent Application No. 201921154826.8, entitled "Battery Pack", filed on Jul. 22, 2019, both of which are hereby incorporated by reference in their entireties.

TECHNICAL FIELD

The present disclosure relates to the field of an energy storage apparatus, and in particular, to a battery pack.

BACKGROUND

With the booming of a new energy vehicle, the technology of a battery pack product is constantly updated. Due to requirements of both the energy density and the cost, the battery pack requires higher group efficiency of a battery module. Therefore, under the premise of meeting a design requirement and ensuring reliability, the battery module is more diverse in forms and specifications. Different from the previous single-column and a-few-series design, it tends to design a large module structure of multiple columns and multiple series, such as the sandwich model. In some solutions, an overall strength of the battery pack is insufficient due to a reduction of mechanical components and mechanical locks with a box. Especially for a box pack with a limited number of mount points and a limited space size, a connection strength between modules in the battery pack is insufficient.

Therefore, there is a need for a new battery pack.

SUMMARY

An embodiment of the present disclosure provides a battery pack, which aims to improve a connection strength between modules in the battery pack.

A battery pack, including: a module assembly including two or more battery modules, wherein each of the battery modules includes a battery core and an end plate, a plurality of battery cores are arranged side by side along a length direction of the battery pack, the end plate is located on at least one side of the plurality of battery cores in the length direction, and the two or more battery modules are arranged side by side along a width direction of the battery pack; and a limiting plate disposed on at least one side of the module assembly in the length direction and correspondingly to the end plate, wherein the limiting plate includes an inner side surface towards the end plate, two or more first inserting and receiving portions are provided on the inner side surface to correspond to two or more end plates respectively, a second inserting and receiving portion is provided on the surface of the end plate towards the limiting plate to correspond to one of the first inserting and receiving portions, and the two or more battery modules are coupled with each of the limiting plates via one of the first inserting and receiving portion and the second inserting and receiving portion respectively.

According to an aspect of the present disclosure, one of each of the first inserting and receiving portions and the second inserting and receiving portion is configured as a groove, and the other is configured as a convex column fitting to the groove.

According to an aspect of the present disclosure, each of the first inserting and receiving portions is configured as a groove, and the second inserting and receiving portion is configured as a convex column fitting to the groove; and the groove is configured as a tapered groove, an aperture of the groove is gradually reduced in a direction away from the end plate, and/or the convex column is configured as a tapered convex column, and a cross section of the convex column is gradually reduced in a direction away from the end plate.

According to an aspect of the present disclosure, each of the first inserting and receiving portions is configured as a groove, and the second inserting and receiving portion is configured as a convex column fitting to the groove; and each of the battery modules further includes a loop disposed on an outer periphery of the end plate and the plurality of battery cores, the loop is configured to protrude from a surface of the end plate, a height of the convex column protruding from the surface of the end plate is greater than a height of the loop protruding from the surface of the end plate, and at least a portion of the convex column is located within the groove.

According to an aspect of the present disclosure, the inner side surface is recessed to form a sinking table, each of the first inserting and receiving portions is disposed on the sinking table, and at least a part of the end plate is located within the sinking table.

According to an aspect of the present disclosure, each of the battery modules includes two end plates, and the two end plates are respectively disposed on two sides of the plurality of battery cores in the length direction; and the number of the limiting plates is two and the two limiting plates are disposed on two sides of the module assembly in the length direction, the inner side surfaces of the two limiting plates are provided with the first inserting and receiving portion, and each of the end plates is provided with the second inserting and receiving portion.

According to an aspect of the present disclosure, the number of the limiting plates is two, and the two limiting plates are respectively disposed on two sides of the module assembly in the length direction; and the battery pack further includes a connecting member spanning the module assembly and connected between the two limiting plates.

According to an aspect of the present disclosure, each of the limiting plates includes a top portion and a bottom portion disposed opposite to each other in a height direction of the battery pack, and two side surfaces disposed opposite to each other in the width direction; and the connecting member includes a side connecting member connected to a side surface of each of the limiting plates, and an intermediate connecting member connected to the top portion of each of the limiting plates.

According to an aspect of the present disclosure, the number of the intermediate connecting members is two or more, and the two or more intermediate connecting members are spaced apart in the width direction;

and/or, a seam is formed between the two adjacent battery modules in the width direction, and the intermediate connecting member is correspondingly disposed above the seam.

According to an aspect of the present disclosure, the connecting member includes two connecting ends disposed opposite to each other in an extension direction of the connecting member, and the connecting member is connected to each of the limiting plates via the connecting ends; and a limiting groove is provided on a surface of the limiting plate to correspond to at least one of the two connecting ends, so that the at least one of the two connecting ends is limited to be located within the limiting groove.

BRIEF DESCRIPTION OF THE DRAWINGS

Other features, objects, and advantages of the present disclosure will become more apparent after reading the following detailed description of a non-restrictive embodiment with reference to accompany drawings, where identical or similar reference signs indicate identical or similar features.

Figure 1:
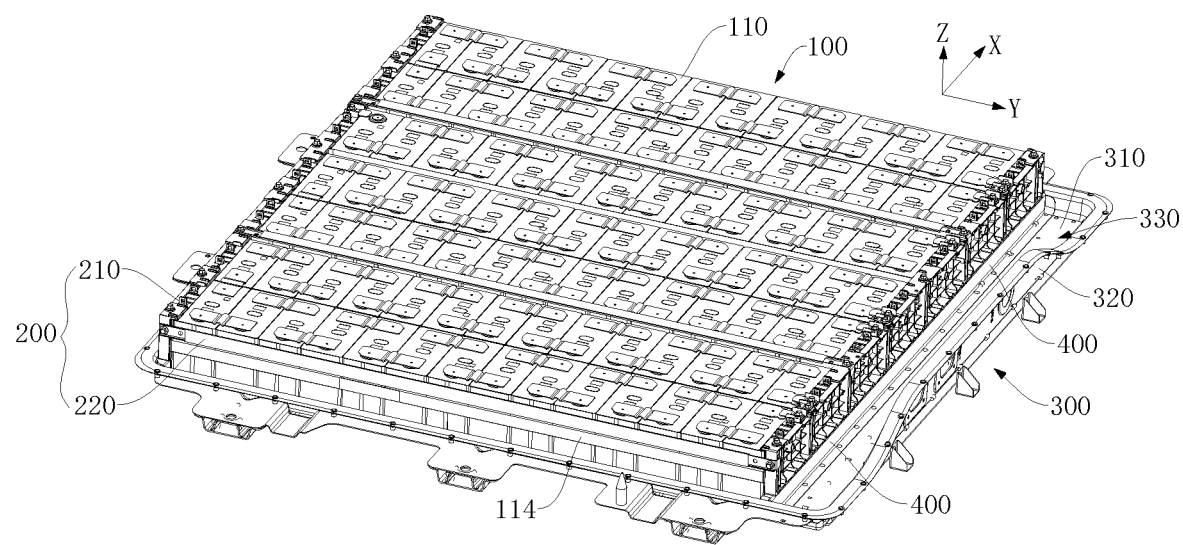
FIG. 1 is a schematic structural view of a battery pack according to an embodiment of the present disclosure.

DESCRIPTION OF REFERENCE SIGNS 100, module assembly; 110, battery module; 111, battery core; 112, end plate; 113, second inserting and receiving portion; 114, loop; 115, seam 200, reinforcing assembly; 210, limiting plate; 211, top portion; 212, bottom portion; 213, side surface; 214, first inserting and receiving portion; 215, limiting groove; 216, sinking table; 220, connecting member; 221, side connecting member; 222, intermediate connecting member; 223, connecting end;

300, lower case; 310, bottom wall; 320, side wall; 330, accommodating space;

400, pressing beam.

DETAILED DESCRIPTION

Features and exemplary embodiments of various aspects of the present disclosure are described in detail below. In the following detailed description, numerous specific details are set forth to provide a comprehensive understanding of the present disclosure. However, it will be apparent to those skilled in the art that the present disclosure may be practiced without some of the details. The following description of the embodiments is merely provided to provide a better understanding of the present disclosure. In the drawings and the following description, at least some common structures and techniques are not shown in order to avoid unnecessary obscuring of the present disclosure. And for clarity, dimensions of some structures may be exaggerated. Furthermore, features, structures, or characteristics described hereinafter may be combined in any suitable manner in one or more embodiments.

In the description of the present disclosure, it should be noted that, unless otherwise stated, the meaning of "multiple" is two or more; an orientation or positional relationship indicated by the terms "upper", "lower", "left", "right", "inside", "outside" is merely for conveniently and simply describing the present disclosure, does not indicate or imply that the device or component referred to has a specific orientation and is constructed and operated in a specific orientation, and therefore cannot be construed as a restriction to the present disclosure. Moreover, the terms "first", "second", etc. are used for descriptive purposes only and are not to be construed as indicating or implying relative importance.

The terms concerning orientations appearing in the following description are all directions shown in the drawings, and are not intended to limit the specific structure of the embodiments of the present disclosure. In the description of the present disclosure, unless otherwise stated, it should also be noted that the terms "installation" and "connection" are to be understood broadly, and may be, for example, a fixed connection or a detachable connection, or an integral connection; and can be connected directly or indirectly. For those skilled in the art, the specific meanings of the above terms in the present disclosure can be understood as the case may be.

For a better understanding of the present disclosure, the battery pack of the embodiment of the present disclosure will be described in detail below with reference to FIGS. 1 to 6.

FIG. 1 is a schematic structural view of a battery pack according to an embodiment of the present disclosure. The battery pack includes a module assembly 100 and a reinforcing assembly 200 for improving a connection strength between the battery modules 110 in the module assembly 100.

The module assembly 100 includes two or more battery modules 110. Each of the battery modules 110 includes a battery core 111 and an end plate 112. The plurality of battery cores 111 are arranged side by side along a length direction of the battery pack (the Y direction in FIG. 1). The end plate 112 is located on at least one side of the plurality of battery cores 111 in the length direction, and two or more battery modules 110 are arranged side by side along a width direction of the battery pack (the X direction in FIG. 1). A limiting plate 210 is disposed on at least one side of the module assembly 100 in the length direction and correspondingly to the end plate 112. The limiting plate 210 includes an inner side surface towards the end plate 112, and two or more first inserting and receiving portions 214 are provided on the inner side surface to correspond to two or more end plates 112 respectively. A second inserting and receiving portion 113 is provided on a surface of the end plate 112 towards the limiting plate 210 to correspond to one of the first inserting and receiving portions 214. The two or more battery modules 110 and the limiting plate 210 are coupled to each other via one of the first inserting and receiving portions 214 and the second inserting and receiving portion respectively.

In the present disclosure, the battery pack includes the module assembly 100 and the limiting plate 210. The module assembly 100 includes a plurality of battery modules 110 arranged side by side in the width direction, and each of the battery modules 110 includes the end plate 112. The first inserting and receiving portions 214 are provided on the inner side surface of the limiting plate 210, the second inserting and receiving portion 113 is provided on the end plate 112, and the plurality of battery modules 110 can be coupled to the limiting plate 210 via the second inserting and receiving portion 113 of the end plate 112 and one of the first inserting and receiving portions 214. Moreover, even if extending distances of the battery modules 110 in the length direction are different, resulting in a length difference between the battery modules 110, the length difference can be compensated for by the first inserting and receiving portions 214 and the second inserting and receiving portion 113. The stability of each end plate 112, that is, a relative position between each battery module 110 and the limiting plate 210 is sufficiently ensured. Therefore, the plurality of battery modules 110 can be connected together via the limiting plate 210, and the plurality of battery modules 110 can be fixed between the limiting plate 210 and a side wall 320 of a battery pack case via the limiting plate 210. A connection strength between the plurality of battery modules 110 in the battery pack is improved.

The manner in which the battery pack is disposed is not limited thereto. In some optional embodiments, the battery pack further includes a lower case 300. The lower case 300 includes a bottom wall 310 and a side wall 320 connected to each other, and an accommodating space 330 surrounded by the bottom wall 310 and the side wall 320. The module assembly 100 and the limiting plate 210 are both disposed in the accommodating space 330.

In some optional embodiments, in order to ensure that the limiting plate 210 is stably located in the accommodating space 330 of the lower case 300, the lower case 300 is further provided with a pressing beam 400. The pressing beam 400 and one of the side walls 320 are spaced apart to limit the limiting plate 210 and the module assembly 100 between the pressing beam 400 and the side wall 320, so as to ensure the stability of the relative position between the module assembly 100, the limiting plate 210 and the lower case 300.

The number of the limiting plates 210 is not limited. The number of the limiting plate 210 may be only one. In the battery pack, the plurality of battery modules 110 are fixed between the limiting plate 210 and the side wall 320 via the limiting plate 210.

Figure 2:
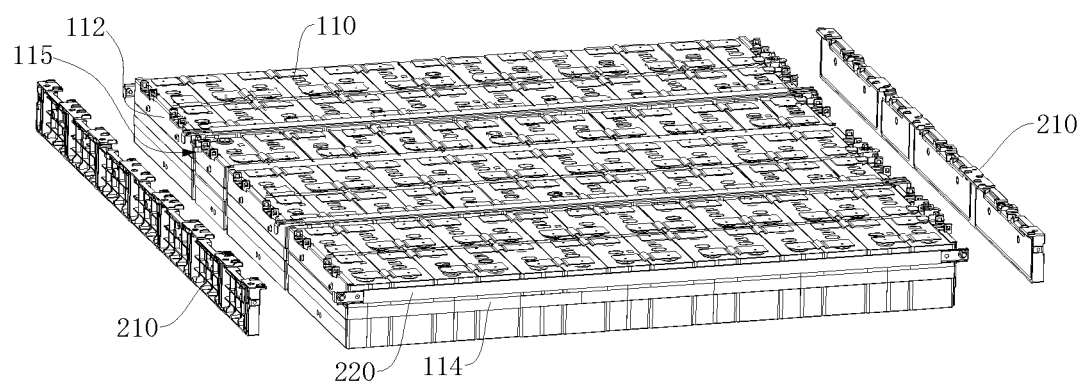
FIG. 2 is a schematic exploded view of a battery pack according to an embodiment of the present disclosure.

Referring to FIG. 2, in other optional embodiments, the number of the limiting plates 210 is two. The two limiting plates 210 are spaced apart in the length direction, and the module assembly 100 is located between the two limiting plates 210. The battery module 110 includes two end plates 112 that are located on both sides of the plurality of battery cores 111 in the length direction. The first inserting and receiving portions 214 are respectively provided on the inner side surfaces of each of the two limiting plates 210, and the second inserting and receiving portion 113 is provided on each of the end plates 112 on both sides of the plurality of battery cores 111. The module assembly 100 is coupled between the two limiting plates 210 via one of the first inserting and receiving portions 214 and the second inserting and receiving portion 113 to further improve the connection strength between the battery modules 110 in the battery pack.

Figure 3:
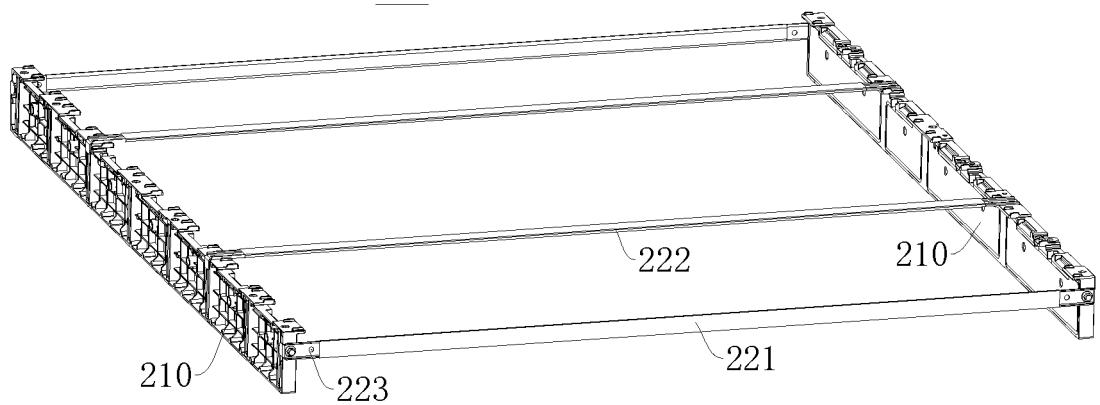
FIG. 3 is a schematic structural view of a reinforcing assembly of a battery pack according to an embodiment of the present disclosure.
Figure 4:
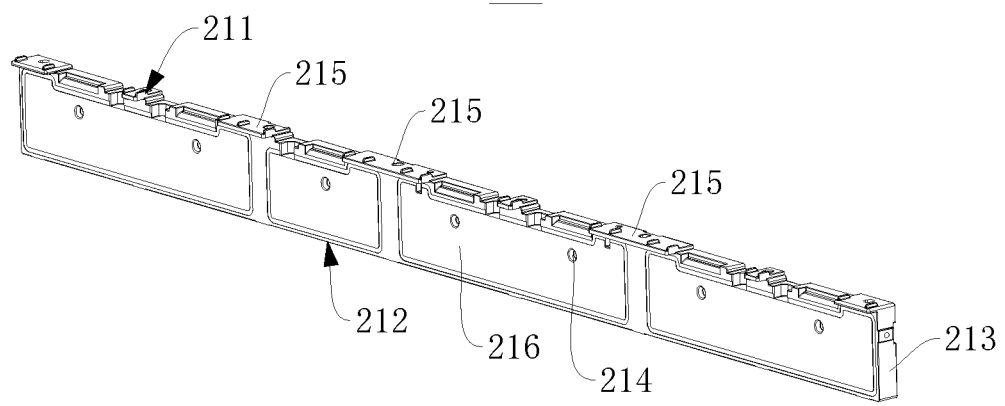
FIG. 4 is a schematic structural view of a limiting plate of a battery pack according to an embodiment of the present disclosure.
Figure 5:
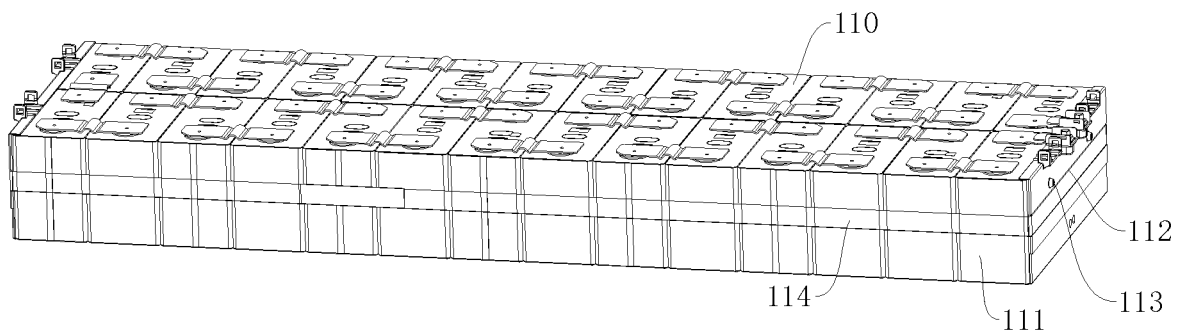
FIG. 5 is a schematic structural diagram of a battery module of a battery pack according to an embodiment of the present disclosure.
Figure 6:
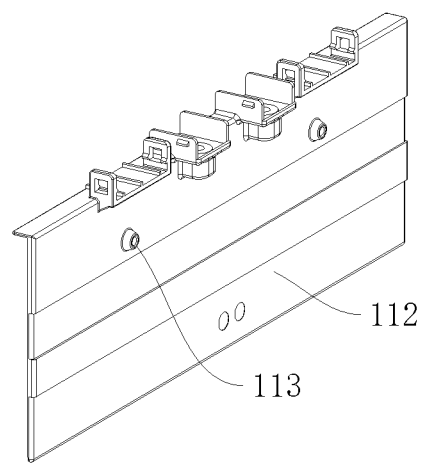
FIG. 6 is a schematic structural view of an end plate of a battery pack according to an embodiment of the present disclosure.

As shown in FIG. 3, when the number of the limiting plates is two, and the two limiting plates 210 are disposed on both sides of the module assembly 100, a connecting member 220 may be connected between the two limiting plates 210. The connecting member 220 spans the module assembly 100 and is connected between the two limiting plates 210 to ensure the stability of a relative position between the two limiting plates 210.

In some optional embodiments, the connecting member 220 includes opposite connecting ends 223 in an extension direction thereof, and the connecting member 220 is connected to one of the limiting plates 210 via the connecting ends 223. A limiting groove 215 is provided on a surface of each of the limiting plates 210 to correspond to at least one of the connecting ends 223, so that the at least one connecting end 223 is limited to be located within the limiting groove 215. In these optional embodiments, the limiting groove 215 is provided on each of the limiting plates 210, and the connecting end 223 is disposed within the limiting groove 215. The stability of the relative position between the limiting ends 223 and each of the limiting plates 210 can be improved via a limit of the limiting groove 215.

The connection position of the connecting member 220 and the limiting plate 210 is not limited. In some optional embodiments, the limiting plate 210 includes a top portion 211 and a bottom portion 212 that are oppositely disposed along a height direction of the battery pack (the Z direction in FIG. 1), and two side surfaces 213 disposed opposite to each other in the width direction. The connecting member 220 includes a side connecting member 221 and an intermediate connecting member 222, the side connecting member 221 is connected to the side surface 213 of each of the limiting plates 210, and the intermediate connecting member 222 is connected to the top portion 211 of each of the limiting plates 210.

The number of the side connecting members 221 is not limited. Preferably, the number of the side connecting members 221 is two, and the two side connecting members 221 are respectively connected to two side surfaces 213 of each of the limiting plates 210. The connection strength between the battery modules 110 in the battery pack can be further improved via a limiting force in the width direction provided by the two side connecting members 221 to the module assembly 100.

The position of the intermediate connecting member 222 is not limited herein, and the intermediate connecting member 222 may be located in a gap between two adjacent battery modules 110. Preferably, the intermediate connecting member 222 spans above the module assembly 100 so as not to increase a dimension of the module assembly 100 in the width direction, thereby achieving space saving.

The position of the intermediate connecting member 222 above the module assembly 100 is not limited. Preferably, a seam 115 is formed between two battery modules 110 adjacent in the width direction, and the intermediate connecting member 222 is correspondingly disposed above the seam 115. Generally, a spacer assembly is provided above the battery module 110, and the intermediate connecting member 222 is disposed corresponding to the seam 115. A position can be reserved for the spacer assembly, especially when the connecting member 220 is made of a conductive metal material, and the connecting member 220 can be prevented from affecting the connection between components in the spacer assembly to improve the safety performance of the battery pack.

The number of the intermediate connecting member 222 is not limited, and there may be only one intermediate connecting member 222 or two or more intermediate connecting members 222. When the number of the intermediate connecting members 222 is two or more, two or more intermediate connecting members 222 are spaced apart in the width direction.

In any of the above embodiments, the manner in which the first inserting and receiving portions 214 and the second inserting and receiving portion 113 are disposed is not limited herein. For example, referring to FIG. 4 to FIG. 6, one of each of the first inserting and receiving portions 214 and the second inserting and receiving portion 113 is configured as a groove, and the other is configured as a convex column corresponding to the groove. The convex column is inserted into the groove to achieve a mutual insertion of each of the first inserting and receiving portions 214 and the second inserting and receiving portion 113.

Shapes of the groove and the convex column are not limited herein. Preferably, the groove is configured as a tapered groove, and the convex column is configured as a tapered convex column. Via the fitting of the tapered groove and convex column, each of the first inserting and receiving portions 214 and the second inserting and receiving portion 113 can be tightly fitted, and each of the first inserting and receiving portions 214 and the second inserting and receiving portion 113 can also be aligned with each other.

In some embodiments, each of the first inserting and receiving portions 214 is configured as the groove and the second inserting and receiving portion 113 is configured as the convex column fitting to the groove. The second inserting and receiving portion 113 disposed on the end plate 112 is configured as the convex column that does not weaken the strength of the end plate 112. The groove may be configured as a blind groove, or the groove may be configured as a through groove passing through the limiting plate 210.

When each of the first inserting and receiving portions 214 is configured as the groove, the second inserting and receiving portion 113 is configured as the convex column, the groove is configured as the tapered groove, and the convex column is configured as the tapered convex column, the aperture of the groove is gradually reduced in a direction away from the end plate 112, and the cross section of the convex column is gradually reduced in a direction away from the surface of the end plate 112. The groove is configured as the tapered groove, which can increase the size of an opening of the groove. The convex column is configured as the tapered convex column, which can reduce the size of a free end of the convex column, thereby facilitating insertion of the convex column into the groove and facilitating the first inserting and receiving portion 214 and the second inserting and receiving portion 113 to be aligned with each other.

In some optional embodiments, each of the battery modules 110 further includes a loop 114 that is sleeved on an outer periphery of the end plate 112 and protrudes from the surface of the plurality of battery cores 111. The loop 114 protrudes from the surface of the end plate 112. The height of the convex column protruding from the surface of the end plate 112 is greater than the height of the loop 114 protruding from the surface of the end plate 112, and at least a portion of the convex column is located within the groove.

In these alternative embodiments, the height of the convex column protruding from the surface of the end plate 112 is greater than the height of the loop 114 protruding from the surface of the end plate 112 such that the convex column can protrude from the loop 114. When each of the first inserting and receiving portions 214 and the second inserting and receiving portion 113 are inserted into each other, it is convenient to insert the convex column into the groove.

In order to further improve the stability of the relative position between each of the battery module 110 and the limiting plate 210, in some optional embodiments, the inner side surface of the limiting plate 210 is recessed to form a sinking table 216, each of the first inserting and receiving portions 214 is located at the sinking table 216, and at least a portion of the end plate 112 is located within the sinking table 216. In these alternative embodiments, the sinking table 216 can limit the end plate 112 to further increase the stability of the relative position between the end plate 112 and the limiting plate 210.

The number of the second inserting and receiving portion 113 on the end plate 112 is not limited, and the end plate 112 may be provided with one second inserting and receiving portion 113. Alternatively, two or more second inserting and receiving portions 113 may be provided on the end plate 112. The two second inserting and receiving portions 113 are spaced apart from each other on the end plate 112. Correspondingly, two or more first inserting and receiving portions 214 are provided on the limiting plate 210 to correspond to the end plate 112. The limiting plate 210 and the end plate 112 can be snap-connected to each other via two or more second inserting and receiving portions 113 and two or more first inserting and receiving portions 214, thereby further improving the stability of the relative position between the limiting plate 210 and the end plate 112.

The present disclosure can be embodied in other specific forms without departing from the spirit and scope thereof. The present embodiments are to be considered in all respects as illustrative and non-restrictive. The scope of the present disclosure is defined by the appended claims rather than the above description, and all changes falling within the scope of the claims and the equivalents thereof are included in the scope of the present disclosure.

What is claimed is:

1. A battery pack, comprising:
    a module assembly comprising two or more battery modules, wherein each of the battery modules comprises a battery core and an end plate, a plurality of battery cores are arranged side by side along a length direction of the battery pack, the end plate is located on at least one side of the plurality of battery cores in the length direction, and the two or more battery modules are arranged side by side along a width direction of the battery pack;
    a limiting plate disposed on at least one side of the module assembly in the length direction, wherein one limiting plate corresponds to the two or more battery modules, the end plate of each battery module is disposed between the limiting plate and a respective battery core, the limiting plate comprises an inner side surface towards the end plate, two or more first inserting and receiving portions are provided on the inner side surface to correspond to two or more end plates respectively, a second inserting and receiving portion is provided on the surface of the end plate towards the limiting plate to correspond to one of the first inserting and receiving portions, and the two or more battery modules are coupled with the limiting plate via one of the first inserting and receiving portions and the second inserting and receiving portion respectively, and
    each of the first inserting and receiving portions is configured as a groove, and the second inserting and receiving portion is integrally joined with the end plate and configured as a convex column fitting to the groove.

2. The battery pack according to claim 1, wherein the groove is configured as a tapered groove, an aperture of the groove is gradually reduced in a direction away from the end plate, and/or the convex column is configured as a tapered convex column, and a cross section of the convex column is gradually reduced in a direction away from the end plate.

3. The battery pack according to claim 1, wherein
    each of the battery modules further comprises a loop disposed on an outer periphery of the end plate and the plurality of battery cores, the loop is configured to protrude from a surface of the end plate, a height of the convex column protruding from the surface of the end plate is greater than a height of the loop protruding from the surface of the end plate, and at least a portion of the convex column is located within the groove.

4. The battery pack according to claim 1, wherein the inner side surface is recessed to form a sinking table, each of the first inserting and receiving portions is disposed on the sinking table, and at least a part of the end plate is located within the sinking table.

5. The battery pack according to claim 1, wherein each of the battery modules comprises two end plates, and the two end plates are respectively disposed on two sides of the plurality of battery cores in the length direction; and the number of the limiting plates is two and the two limiting plates are disposed on two sides of the module assembly in the length direction, the inner side surfaces of the two limiting plates are provided with the first inserting and receiving portions, and each of the end plates is provided with the second inserting and receiving portion.

6. The battery pack according to claim 1, wherein the number of the limiting plates is two, and the two limiting plates are respectively disposed on two sides of the module assembly in the length direction, and the battery pack further comprises a connecting member spanning the module assembly and connected between the two limiting plates.

7. The battery pack according to claim 6, wherein each of the limiting plates comprises a top portion and a bottom portion disposed opposite to each other in a height direction of the battery pack, and two side surfaces disposed opposite to each other in the width direction; and the connecting member comprises a side connecting member connected to the side surface of each of the limiting plates, and an intermediate connecting member connected to the top portion of each of the limiting plates.

8. The battery pack according to claim 7, wherein the number of the intermediate connecting members is two or more, and the two or more intermediate connecting members are spaced apart in the width direction;

and/or, a seam is formed between the two adjacent battery modules in the width direction, and the intermediate connecting member is correspondingly disposed above the seam.

9. The battery pack according to claim 6, wherein the connecting member comprises two connecting ends disposed opposite to each other in an extension direction of the connecting member, and the connecting member is connected to each of the limiting plates via the connecting ends; and a limiting groove is provided on a surface of each of the limiting plates to correspond to at least one of the two connecting ends, so that the at least one of the two connecting ends is limited to be located within the limiting groove.

10. The battery pack according to claim 2, wherein each of the battery modules further comprises a loop disposed on an outer periphery of the end plate and the plurality of battery cores, the loop is configured to protrude from a surface of the end plate, a height of the convex column protruding from the surface of the end plate is greater than a height of the loop protruding from the surface of the end plate, and at least a portion of the convex column is located within the groove.

11. The battery pack according to claim 2, wherein the inner side surface is recessed to form a sinking table, each of the first inserting and receiving portions is disposed on the sinking table, and at least a part of the end plate is located within the sinking table.

12. The battery pack according to claim 3, wherein the inner side surface is recessed to form a sinking table, each of the first inserting and receiving portions is disposed on the sinking table, and at least a part of the end plate is located within the sinking table.

13. The battery pack according to claim 3, wherein each of the battery modules comprises two end plates, and the two end plates are respectively disposed on two sides of the plurality of battery cores in the length direction; and the number of the limiting plates is two and the two limiting plates are disposed on two sides of the module assembly in the length direction, the inner side surfaces of the two limiting plates are provided with the first inserting and receiving portions, and each of the end plates is provided with the second inserting and receiving portion.

14. The battery pack according to claim 4, wherein each of the battery modules comprises two end plates, and the two end plates are respectively disposed on two sides of the plurality of battery cores in the length direction; and the number of the limiting plates is two and the two limiting plates are disposed on two sides of the module assembly in the length direction, the inner side surfaces of the two limiting plates are provided with the first inserting and receiving portions, and each of the end plates is provided with the second inserting and receiving portion.

15. The battery pack according to claim 5, wherein the battery pack further comprises a connecting member spanning the module assembly and connected between the two limiting plates.

16. The battery pack according to claim 5, wherein the battery pack further comprises a lower case, the lower case comprises a bottom wall, a side wall connected to each other, and an accommodating space surrounded by the bottom wall and the side wall, and the module assembly and the limiting plates are both disposed in the accommodating space.

* * * * *